Nov. 27, 1923. 1,475,469
N. P. BACH
METHOD OF AND APPARATUS FOR SEALING CONTAINERS
Filed Oct. 29, 1921 8 Sheets-Sheet 5
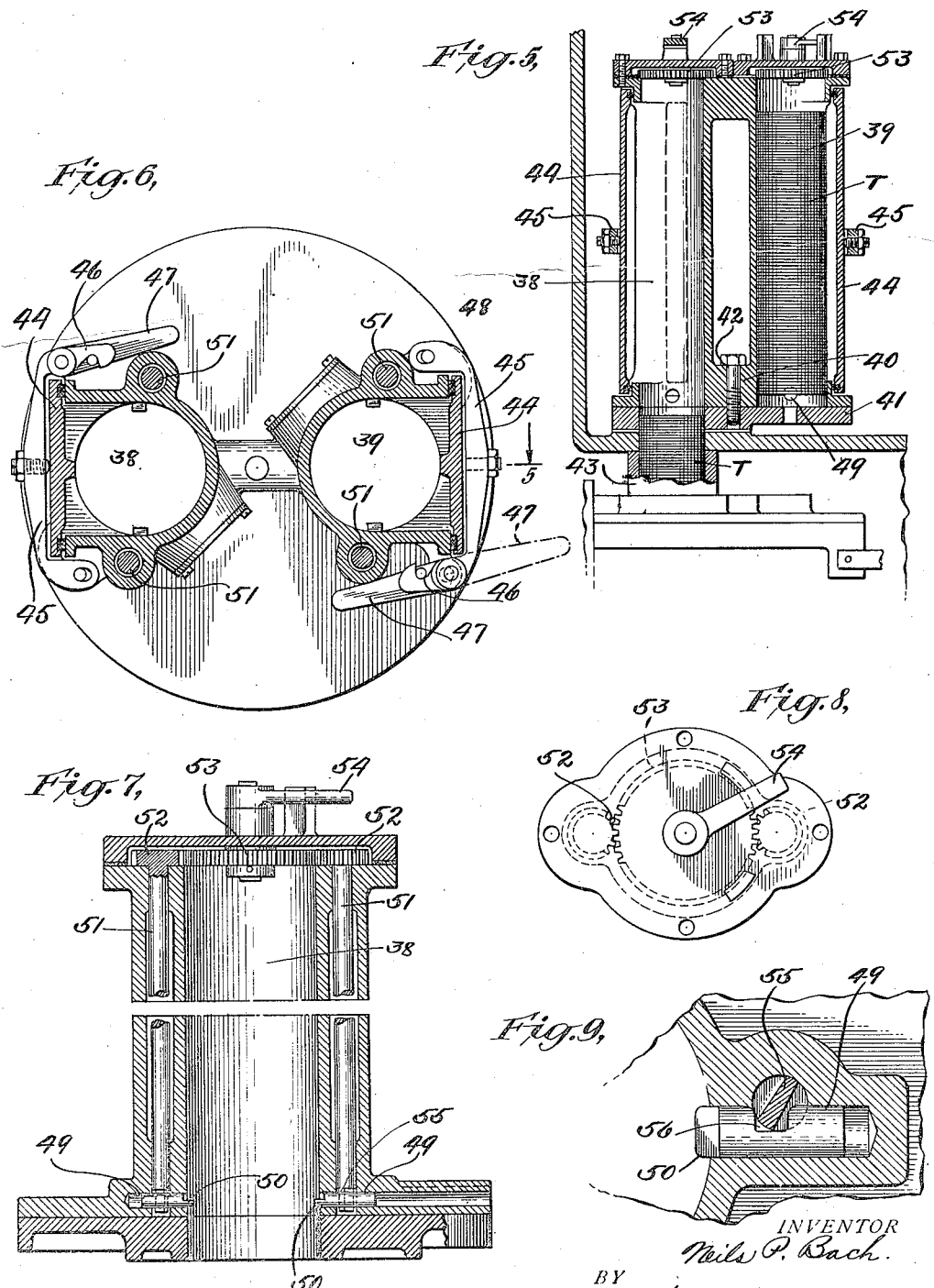

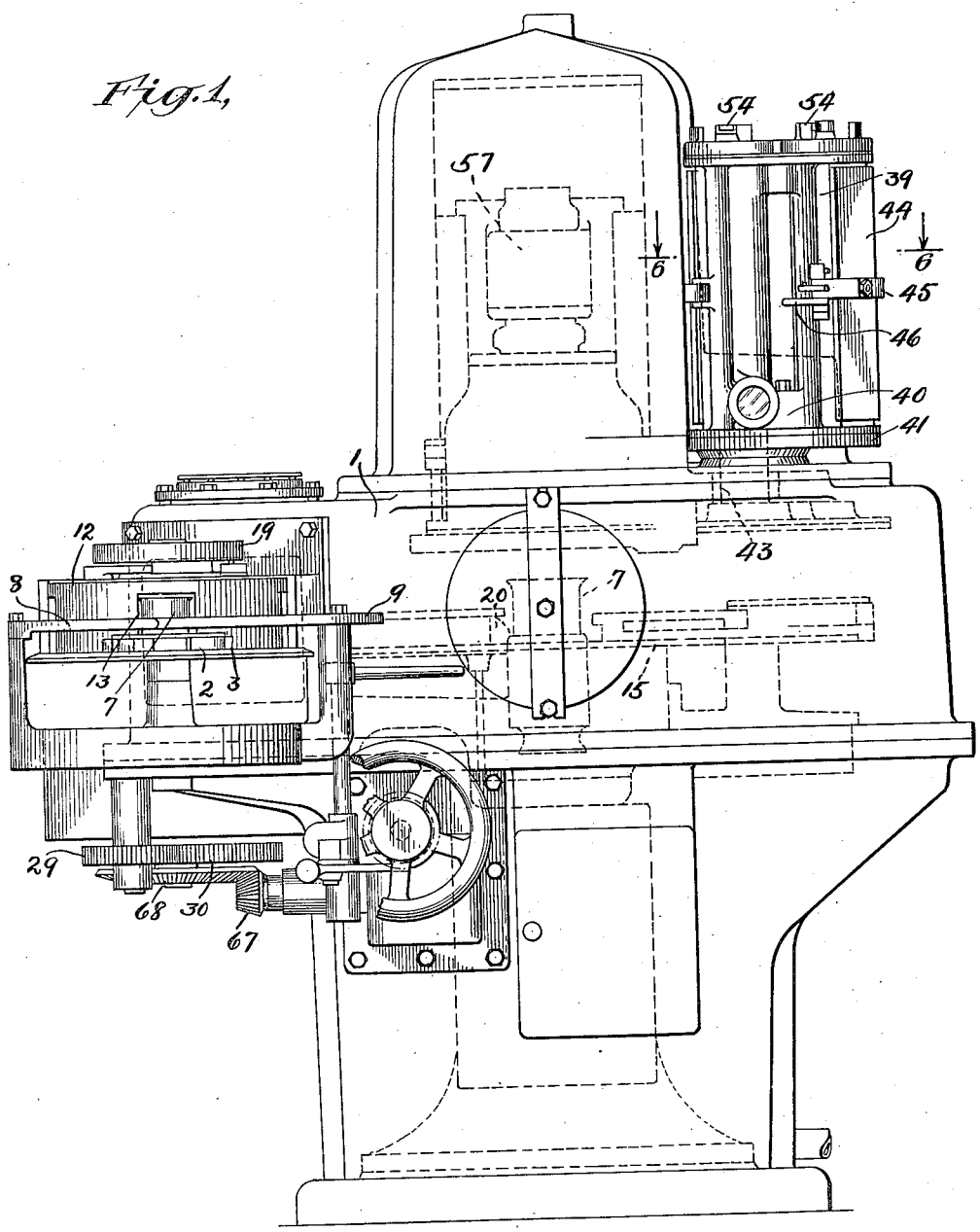

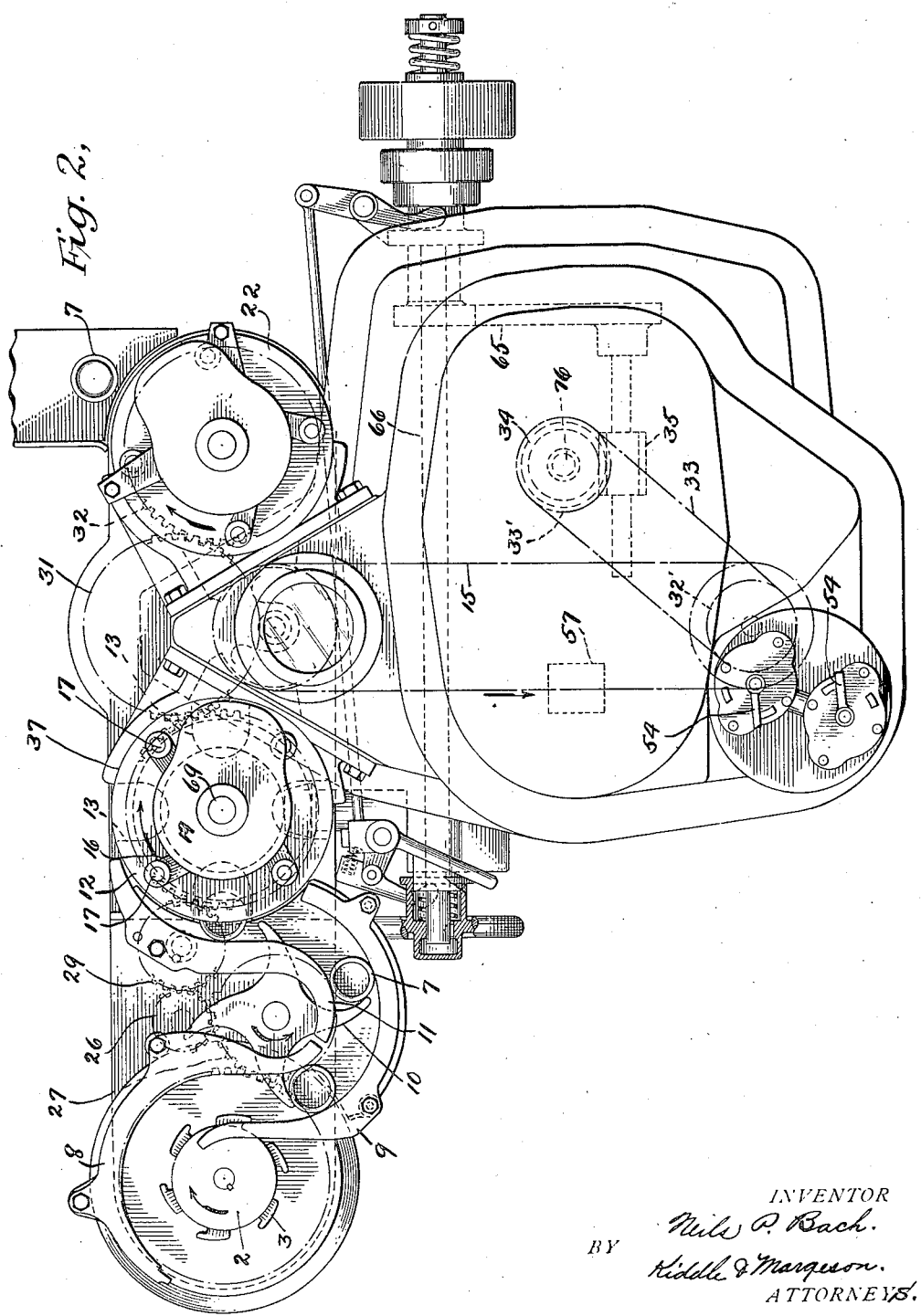

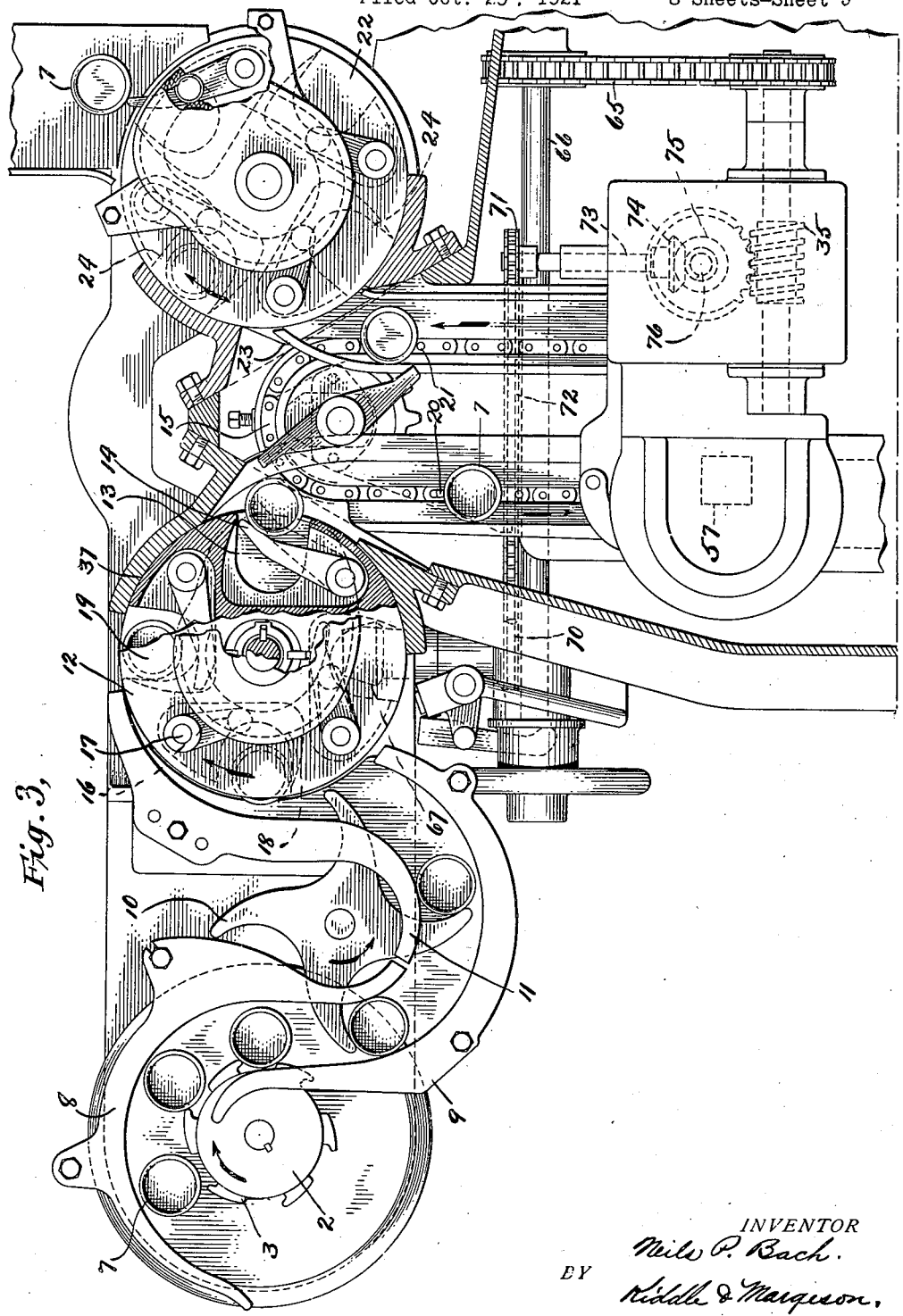

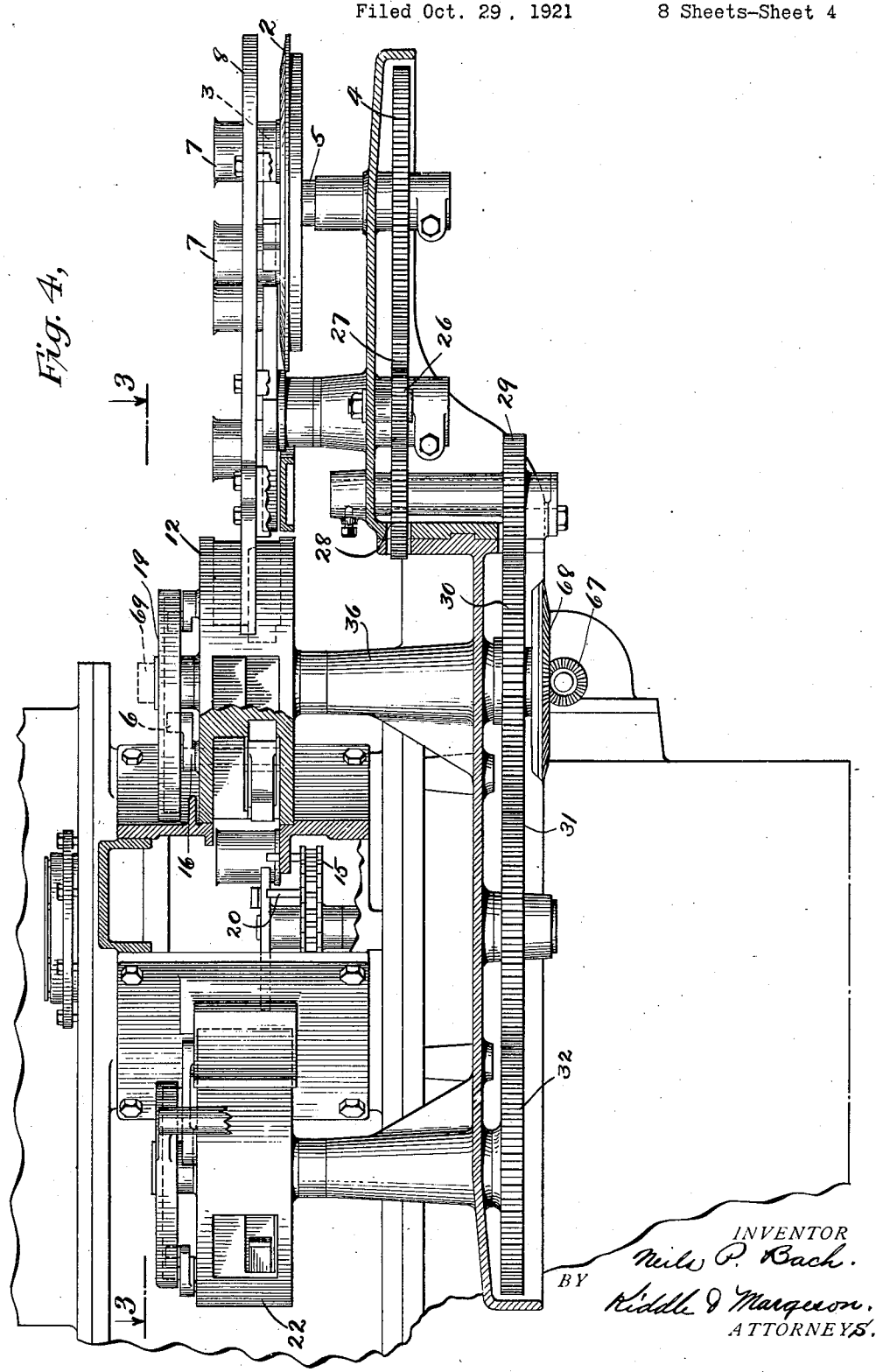

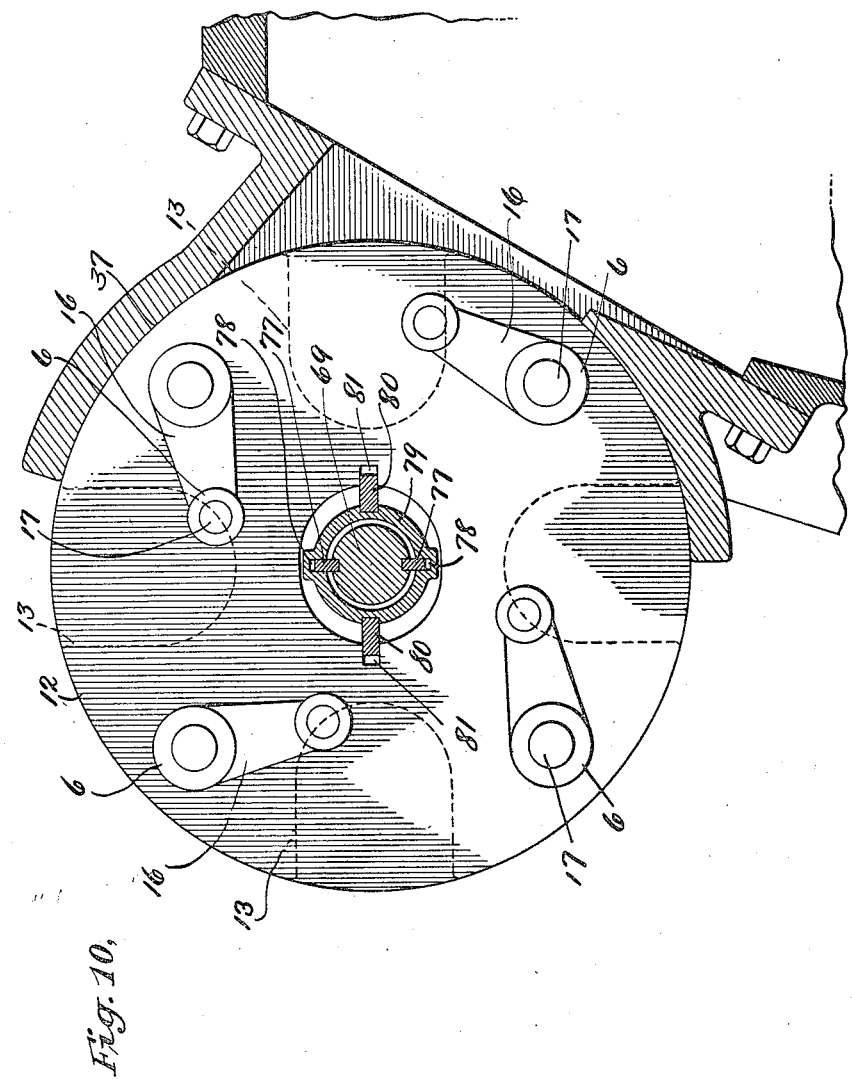

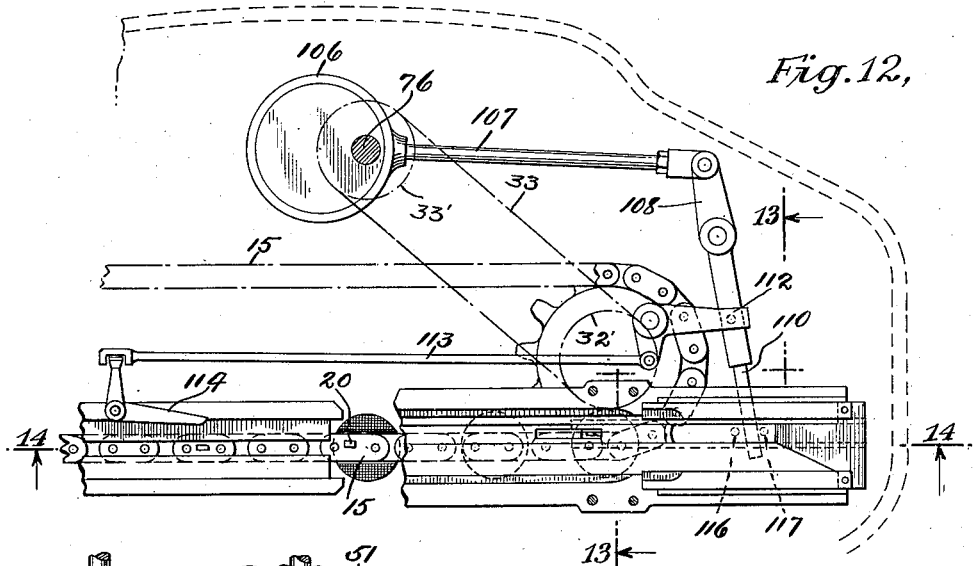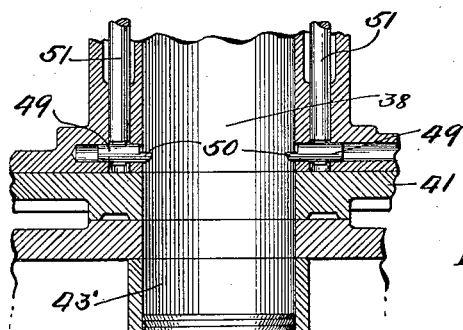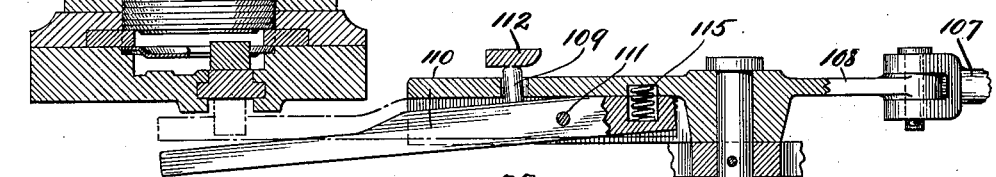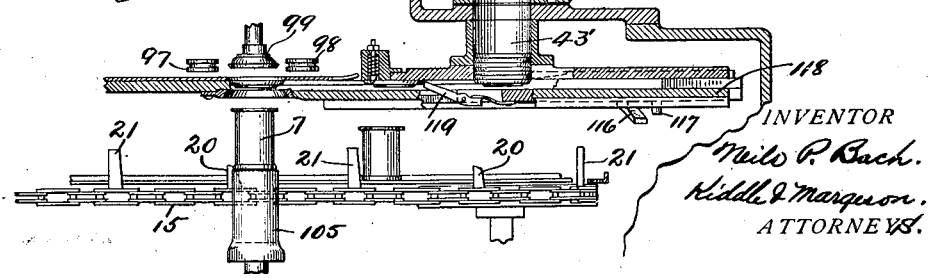

Patented Nov. 27, 1923.

1,475,469

UNITED STATES PATENT OFFICE.

NEILS PETERSEN BACH, OF MILLBURN, NEW JERSEY, ASSIGNOR TO PERFECT VACUUM CANNING COMPANY, OF NEW YORK, N. Y., A CORPORATION OF MAINE.

METHOD OF AND APPARATUS FOR SEALING CONTAINERS.

Application filed October 29, 1921. Serial No. 511,414.

*To all whom it may concern:*

Be it known that I, NEILS P. BACH, a subject of the King of Denmark, and a resident of Millburn, county of Essex, and State of New Jersey, have invented certain new and useful Improvements in Methods of and Apparatus for Sealing Containers, of which the following is a specification.

My invention relates to a method of and apparatus for sealing containers wherein the containers are sealed in a vacuum, an object of the invention being the provision of a method and apparatus whereby a series of uncovered, filled containers may be fed continuously into a vacuumizing chamber, subjected to a vacuum in said chamber, covered, sealed and discharged from the vacuumizing chamber.

A further object of my invention is the provision of a method and apparatus of the character above indicated wherein the supply of covers or tops for the containers is so located that the tops may be applied to the containers while the latter are under a vacuum as distinguished from present practice wherein the tops are loosely applied to the containers before the same are fed into the vacuumizing chamber.

A further object of my invention is the provision of a method and apparatus whereby the containers may be fed into the vacuumizing chamber in a filled condition, subjected to a vacuum, the covers applied, the containers sealed and then finally discharged from the vacuumizing chamber without breaking the vacuum in the chamber. In other words, my improved method may be worked continuously.

A still further object of my invention is the provision of means for conveying the filled containers in a continuous motion into the vacuumizing chamber and up to a sealing station therein where the containers are brought to rest and sealed, the advantage of such an arrangement being that the containers may be fed without their tops although in a filled condition into the vacuumizing chamber without spilling the contents of the containers.

Other objects of the invention will be apparent from the detailed description which follows.

In the accompanying drawings wherein an embodiment of my invention has been illustrated,—

Fig. 1 shows my improved apparatus in elevation;

Fig. 2 is a plan view of the feed and discharge mechanism employed whereby the containers are fed to the vacuumizing chamber and discharged therefrom;

Fig. 3 is a view similar to Fig. 2, some of the parts of the apparatus being broken away to show construction details. This view is taken substantially on the line 3—3 of Fig. 4;

Fig. 4 is an elevation of the feeding and discharge mechanism, showing the driving mechanism therefor;

Fig. 5 is a sectional, elevational view of the magazine for the container tops, this view being taken substantially on the line 5—5 of Fig. 6;

Fig. 6 is a section taken substantially on the line 6—6 of Fig. 1;

Fig. 7 is a sectional elevation through the magazine for the container tops;

Fig. 8 is a plan view of Fig. 7;

Fig. 9 shows on an enlarged scale and in section the mechanism by which the container tops are held in the magazine;

Fig. 10 is a plan view partly in section of the inlet valve;

Fig. 12 shows an apparatus capable of conveying the container tops from the magazine to the sealing mechanism of Fig. 11;

Fig. 13 is a view substantially on the line 13—13 of Fig. 12; and

Fig. 14 is a view taken substantially on the line 14—14 of Fig. 12.

Figure 11:
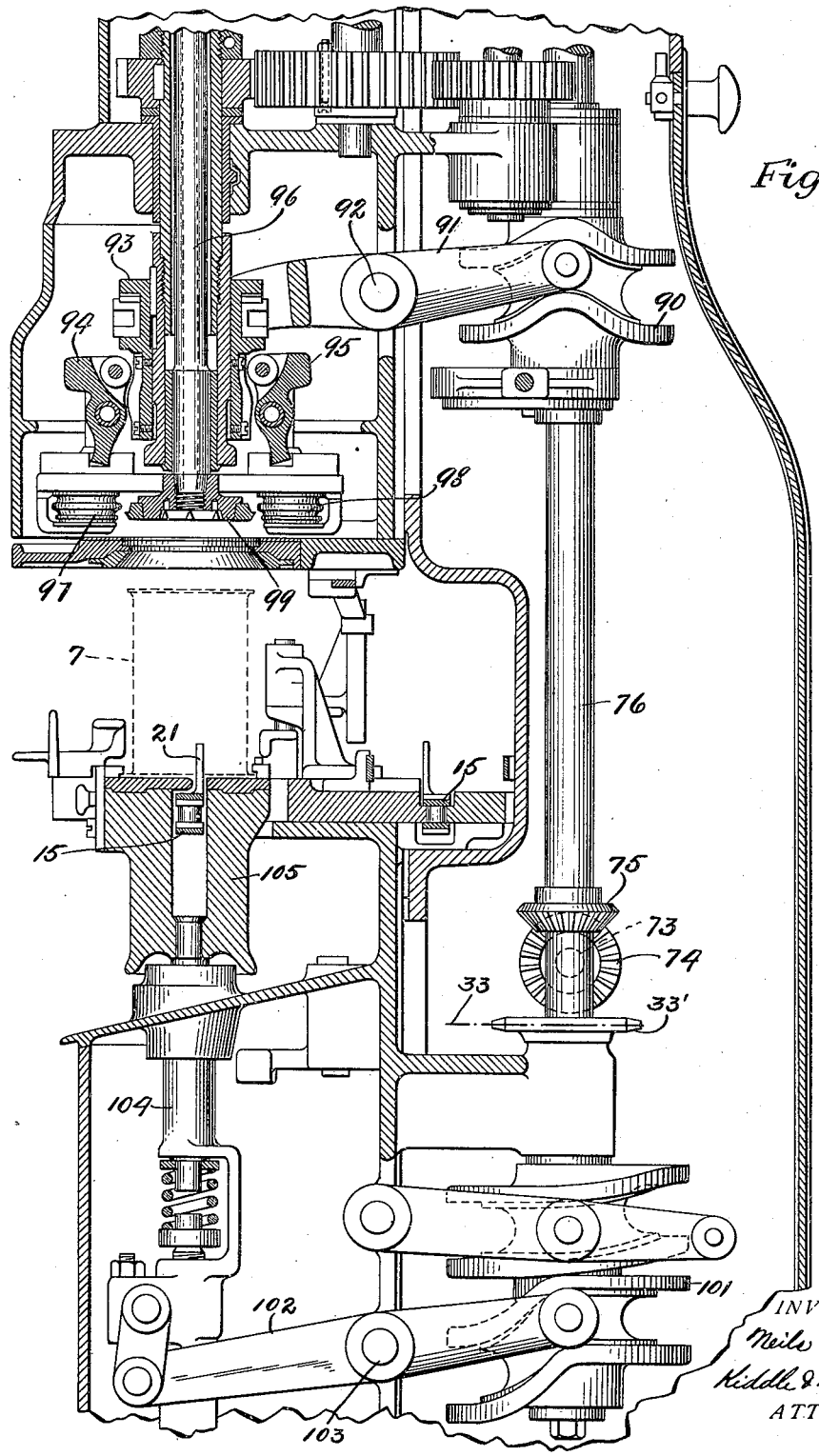
Fig. 11 is a specific type of sealing mechanism, the same having been shown in part sectional elevation.

Referring to the drawings in detail,—1 designates a vacuumizing chamber into which the containers are fed by means of a feeding mechanism shown in plan in Figs. 2 and 3 and in elevation in Figs. 1 and 4. This feeding mechanism comprises a rotary disk 2 provided with container-engaging lugs 3, this disk being driven by a gear-train shown in Fig. 4 and which will be hereinafter described in detail. I may here mention, however, that the disk is driven by a gear 4 mounted at the base of a column 5 carrying the disk. The containers which I have designated 7 are placed upon the disk or table 2 after filling and as the disk is rotated the container-engaging lugs 3 will engage the periphery of the containers to advance them toward the vacuumizing chamber 1, the containers travelling on the table or disk between curved guides 8 and 9.

As each container reaches a position adjacent the forward end of the guide 8, such as indicated in Fig. 2 for example, it is engaged by a star-wheel 10 which is rotated in synchronism with the disk or table 2, this star-wheel advancing the container toward the vacuumizing chamber, the container now being guided by the curved guide 9 already referred to and a curved guide 11, the container at about this time having moved out of contact with the guide 8. The container is advanced by the star-wheel until it reaches the rotary inlet valve designated 12 which is provided with a series of pockets 13 to receive the container, this valve rotating in synchronism with the star-wheel and the disk or table 2. The pockets 13 are disposed in the periphery of the valve in such a manner as to bring a pocket in position to receive a container as the latter is moved up to the periphery of the valve by rotation of the star-wheel 10 already referred to.

The valve 12, it will be noticed, seats in a port 37 cut through the wall of the vacuumizing chamber 1, the port, of course, conforming to the cylindrical periphery of the valve.

The containers resting in the pockets 13 of the inlet valve are carried by the latter until they reach the position, or the approximate position, shown in Fig. 3 at which time a finger 14 carried by the valve engages the container and transfers the same to a chain 15 which is mounted within the vacuumizing chamber. The finger 14 is pivoted and may be operated by any suitable mechanism to cause the finger to move from the full-line position of Fig. 3 to the dotted-line position of said figure to effect the mentioned transfer of the container to the chain 15. In the present construction the fingers are operated through the medium of lever arms 16 mounted on the shafts 17 which carry the fingers, the upper end of these lever arms, as shown in Fig. 4, carrying a roller 6 which is adapted to engage a cam slot 18 provided in the plate 19 above the intake valve.

The chain 15 already mentioned upon which the containers are transferred from the inlet valve, carries suitably spaced container-engaging lugs 20 (see Figs. 1, 3 and 12 for example) and inasmuch as the chain 15 is constantly travelling the containers will be advanced thereby to a sealing station 57 within the vacuumizing chamber, this sealing station being shown diagrammatically in Figs. 1, 2 and 3 and in detail in Fig. 11.

I may here mention that the specific type of sealing station illustrated in the accompanying drawings forms no part of my invention and it is to be understood that any other well-known type of sealing mechanism may be employed if desired.

The feeding mechanism, that is to say the disk 2, star-wheel 10 and the inlet valve 12, is driven through the medium of the gear-train shown in Fig. 4, this train comprising spur gears 4, 26, 27, 28, 29, 30, 31 and 32. The chain 15 is driven through the medium of a sprocket 32', chain 33, sprocket 33' and a worm wheel and worm 34, 35, respectively, the latter in turn being driven by a sprocket chain 65 which is driven from a drive shaft 66 which may be driven by any suitable motor. The gears 4 and 26 to 32 inclusive are also driven from the drive shaft 66 through the medium of a bevelled gear 67 which meshes with a gear 68 on the shaft 69 carrying the inlet valve 12, this shaft likewise carrying the gear 30. The gear 67 is operatively connected to the drive shaft 66 through sprockets 70 and 71 connected by a chain 72, the sprocket 71 being mounted upon a shaft 73 carrying a bevelled gear 74 meshing with bevelled gear 75 upon the shaft 76.

The gear-train for driving the feeding mechanism and the chain 15 are so proportioned that from the time the container is placed on the table 2 and up to the time it is brought to rest at the sealing station it is conveyed in a smooth, continuous motion. This enables me to fill the containers and feed them into the vacuumizing chamber before the tops are applied and without danger of spilling their contents.

The sealing mechanism and the apparatus employed for transferring the container tops thereto are shown in Figs. 11 to 14 inclusive and will now be described in detail.

Referring first of all to Fig. 11, it will be seen that the shaft 76 already referred to carries a cam 90, this cam receiving or cooperating with a member 91 which is pivoted at 92. The cam 90 is so shaped that when rotated by the shaft 76 the member 91 will be rocked about its pivot. Secured to the end of the member 91 opposed to the cam 90 is a member 93 carrying two pivoted arms 94 and 95. The member 93 is mounted upon a vertically extending shaft 96 and is rotatable, being driven by a gear-train operatively connected to the shaft 76. The member 93 has connected to it seaming rollers 97 and 98 which rollers are adapted to be rotated on their own axes and also to be rotated with the member 93 and are adapted to cooperate with a chuck 99 carried at the lower end of the shaft 96 already referred to. Adjacent the lower end of the shaft 76 is a cam 101 which is provided for the purpose of rocking a lever 102 about its pivot 103. One end of this lever is connected to a plunger 104 carrying at its upper end a can lifter 105. This can lifter is adapted to receive a container as the same is conducted thereto by the chain 15 and through the medium of the cam 101 and the lever 102 to carry the same upwardly to the seaming rollers 97 and 98 where the container is sealed. The cams 90 and 101 are so arranged on the shaft 76 and so timed with respect to the travel of the chain 15 that as the container reaches a position above the can lifter 105 it is lifted from the chain and carried upwardly, sealed by the seaming rollers 97 and 98 and then lowered to the chain 15 again by which it is carried out of the vacuumizing chamber entirely. I may here mention that in travelling to the can lifter 105 the containers are engaged by the lugs 20 on the chain 15 which lugs as will be seen from Fig. 14 are curved on the face thereof which engages the container so that the container may be lifted from the chain in a smooth, continuous motion, thereby enabling me to fill the containers before the same are fed into the machine. After the containers are sealed they are transferred from the can lifter 105 by lugs 21 on the chain 15.

The inlet valve 12 which I have already referred to is of novel construction in that it is mounted upon its supporting element 36 in such a manner as to enable the valve to have a slight radial movement. This construction is shown in detail in Fig. 2 which will now be referred to.

From this figure it will be seen that the shaft 69 is provided with keys 77 received by key-ways 78 in a bushing 79 surrounding the shaft. This bushing in turn is provided with keys 80 received by key-ways 81 in the body of the valve itself. The bushing 79 is loosely mounted on the shaft 69, there being considerable play between the bushing and said shaft. Likewise there is considerable play between the keys 80 and the key-ways 81 so that the valve may be said to float with respect to the shaft 69 and has movement radially thereto. I provide this particular type of valve for the purpose of insuring that the valve will always be properly seated in its port for inasmuch as the chamber 1 is under a vacuum the valve 12, it will be seen, will be automatically held against its seat by atmospheric pressure.

As I have already pointed out, the containers are fed into the vacuumizing chamber without their tops and while the containers are being subjected to a vacuum. It becomes desirable, therefore, to provide some means whereby the supply of container tops may be replenished from time to time without the necessity of breaking the vacuum in the vacuumizing chamber 1. It also becomes necessary to provide some means for transferring these tops from their magazine to the sealing station. The apparatus for holding a supply of container tops and for enabling me to replenish this supply from time to time is shown in detail in Figs. 5 to 9 inclusive and will now be described.

It will be seen from these figures that I have provided two magazines designated 38 and 39 respectively, each of which is adapted to contain a supply of tops T. Only one magazine is adapted to feed the tops to the containers at a time, the magazines, however, being so disposed relatively to each other and to the vacuumizing chamber that when one magazine is supplying tops to the container the other is available for refilling or reloading. The magazines are carried in a frame 40 which is secured to the side of the vacuumizing chamber in any suitable manner but here shown mounted upon a plate 41, being held in place thereon by a bolt or stud 42. The magazines as a whole are adapted to be rotated about this stud. The vacuumizing chamber is provided with a port 43 so positioned that as the containers pass through the vacuumizing chamber they pass directly beneath this port. The lower end of each magazine is open and designed to register with the port 43 when the magazines are in proper position: for instance, in Fig. 5 the magazine 38 is in position to register with this port in order that the container tops may be discharged from the magazine to containers within the vacuumizing chamber.

As will be seen from Fig. 6, a plate 44 extending vertically of the magazines at the side thereof and held in place by a suitable clamping plate 45 is provided, this clamping plate 45 being held in position by suitable latch mechanism 46. Packing is provided between the plate 44 and the walls of the magazine. When it is desired to replenish one of the magazines the handle 47 may be moved to the dotted-line position of Fig. 6, releasing the latch mechanism 46 and permitting the plate 45 to be swung outwardly about the pivot 48. The plate 44 may now be removed and the magazine refilled. At this time, however, the open end of the other magazine is in register with the port 43 so that container tops may be discharged to containers travelling through the vacuumizing chamber. It will be seen, therefore, that by my improved apparatus the container tops may be replenished from time to time without breaking the vacuum in the vacuumizing chamber and without interrupting the operation of the machine in any way.

In order that the tops may be retained in each magazine conveniently I have provided magazines with studs 49 shown on an enlarged scale in Fig. 9. A pair of these studs is provided to each magazine. The end of each stud adjacent the inner wall of the magazine is provided with lips 50 upon which the container tops are adapted to rest. Simultaneous reciprocation of a pair of studs of each magazine is obtained through the medium of a pair of vertically extending rods 51. The upper ends of each rod carries a small gear 52 meshing with a gear 53 at the top of the magazine and which gear is adapted to be rotated by a handle 54 which is accessible from the exterior of the magazine. The lower ends of the rods 51 are provided with a reduced portion 55 adapted to engage a notch 56 in the stud 49. The mechanism for transferring the container tops from the magazine to the containers is illustrated in Figs. 12, 13 and 14 and will now be described.

It will be seen from Fig. 12 that the shaft 76 heretofore referred to carries an eccentric 106 to which is operatively connected a connecting rod 107 which in turn is attached to a lever 108. A pin 109 passes through the lever 108 and is secured to a member 110 pivoted at 111. The pin 109 is adapted to be engaged by one arm of a bell crank lever 112, the other arm of which is secured to a rod 113 operatively connected to a lever 114. The latter is in a position to be engaged by a container as the same is being conveyed to the sealing station by the chain 15. The member 110 is provided with a spring 115 whereby the member will be normally maintained in the dotted-line position shown in Fig. 13. If a container is being conveyed by the chain 15 to the sealing station the container must engage the lever 114 to rock the same about its pivot, bringing the member 112 out of contact with the pin 109. This permits the member 110 to be rocked about its pivot under the action of the spring 115 and into position to engage two pins 116 and 117 carried upon a slide 118 to which is attached a knife 119. As soon as the member 110 is moved into position between the pins 116 and 117 the slide 118 will, of course, be moved to the left as shown in Fig. 14 carrying the knife 119 into engagement with the lower cover of the stack 43′ to shear the same from the stack and carry the cover over to the sealing station into position immediately above the container which is being raised by the head 105. The lever 108 on its reverse movement will carry the slide 118 back to its original position where all of the parts will be in position to shear another cover from the stack and upon the next movement of the slide. Should another container, however, not be conveyed to the sealing station immediately, the lever 114 will remain in its normal position and hence movement of the lever 108 about its pivot will have no effect upon the slide 118, the member 112 at that time being in engagement with the pin 109. The parts are all timed so that as the container is fed forward and is received by the can lifter 105 a cover will be conveyed from the magazine or stack 43′ to the sealing station where it will be picked up by the container as the latter moves to its foremost position. The cover is then sealed upon the container by the seaming rollers 97 and 98 already referred to and after the sealing operation is completed the container is lowered by the can lifter 105 into the position to be received or engaged by one of the lugs 21 on the chain 15 which will convey the container to the exit of the vacuumizing chamber.

The sealed containers are discharged from the vacuumizing chamber through a discharge port controlled by a discharge valve 22 which is similar in all respects to the inlet valve 12, the container just prior to its reception by the discharge valve 22 being guided by a guide 23 which is so arranged and shaped as to cause the container to be transferred from the chain 15 automatically to the discharge valve.

Inasmuch as the construction of the discharge valve 22 is the same as that of the inlet valve 12 no further description thereof will be given. In other words, it will be understood that this valve is seated by atmospheric pressure and is provided with a series of pockets in its periphery for receiving the containers as they are discharged from the vacuumizing chamber and conveying these containers to the exterior of said chamber without breaking the vacuum in the chamber.

From the foregoing it will be seen that I have provided an improved method and apparatus for treating containers whereby the containers may be fed without their covers to a vacuumizing chamber and there subjected to a vacuum, sealed and discharged from the vacuumizing chamber,—all without breaking the vacuum in the chamber.

It will be seen also that the whole apparatus is automatic in its operation, it being necessary merely to place the containers, filled, upon the disk 2 and to keep the supply of tops in the magazine replenished.

What is claimed as new is:

1. The method of sealing containers which comprises feeding a constant stream of containers into a vacuumizing chamber while maintaining the vacuum unbroken, and also maintaining a supply of container tops within said chamber replenished without breaking the vacuum, then applying said tops to the containers within the chamber and sealing under vacuum.

2. In an apparatus of the class described, the combination of a vacuumizing chamber, means for conveying containers into said chamber, a magazine for holding a supply of container tops, means for conveying the tops to the containers in said chamber and applying them without breaking the vacuum therein, and means for replenishing the supply of container tops while maintaining the vacuum in said chamber.

3. In an apparatus of the class described, the combination of a vacuumizing chamber, means for conveying containers into said chamber while maintaining a vacuum in the chamber, a magazine for holding a supply of container tops, means for conveying the tops to the containers in said chamber and applying them, and means for replenishing the supply of container tops while maintaining the vacuum in said chamber.

4. In an apparatus of the class described, the combination of a vacuumizing chamber, means for conveying containers into said chamber while maintaining a vacuum in the chamber, a magazine for holding a supply of container tops, means for conveying the tops to the containers in said chamber and applying them without breaking the vacuum therein and means for replenishing the supply of container tops while maintaining the vacuum on said chamber.

5. In an apparatus of the class described, the combination of a vacuumizing chamber, a magazine containing a supply of container tops and means for feeding containers into said chamber in a continuous motion and applying the tops from said magazine to the containers in the chamber, said apparatus being operable without breaking the vacuum in said chamber.

6. In an apparatus of the class described, the combination of a vacuumizing chamber, inlet and discharge ports in said chamber, inlet and discharge valves controlling said ports and adapted for continuously conveying containers into said vacuumizing chamber and to discharge said containers as continuously therefrom, a cover supply station within said vacuum chamber, means for supplying covers to said containers, and means for replenishing said supply of covers while maintaining the vacuum in said chamber unbroken.

This specification signed this 25th day of October, 1921.

NEILS PETERSEN BACH.